United States Patent [19]

Ringland

[11] 4,208,620

[45] Jun. 17, 1980

[54] PLURAL ELECTRIC MOTORS DRIVING COMMON LOAD AND HAVING INTERCONNECTIONS FOR LOAD CONTROL

[75] Inventor: William L. Ringland, Haugen, Wis.

[73] Assignee: Siemens-Allis, Inc., Atlanta, Ga.

[21] Appl. No.: 915,788

[22] Filed: Jun. 15, 1978

Related U.S. Application Data

[63] Continuation-in-part of Ser. No. 843,453, Oct. 19, 1977, abandoned, which is a continuation of Ser. No. 633,944, Nov. 20, 1975, abandoned.

[51] Int. Cl.² ............................................... H02P 7/74
[52] U.S. Cl. ..................................... 318/111; 318/98; 318/50; 318/42
[58] Field of Search ............................... 318/8, 41–47, 318/98–100, 111–113, 34, 49, 50, 720, 724

[56] References Cited

U.S. PATENT DOCUMENTS

| 3,564,342 | 2/1971 | Sanders et al. | 318/111 |
| 3,611,080 | 10/1971 | Herzog et al. | 318/99 |

FOREIGN PATENT DOCUMENTS

892196 2/1972 Canada .
1247451 8/1967 Fed. Rep. of Germany .

*Primary Examiner*—Gene Z. Rubinson
*Assistant Examiner*—John W. Redman
*Attorney, Agent, or Firm*—Frederick W. Powers, III

[57] ABSTRACT

A twin electric motor drive for a grinding mill has substantially identical synchronous motors mechanically connected to the drive of the mill, and the stator winding which generates a revolving magnetic field in each motor comprises a plurality of phase windings each of which is energized from a separate phase of a polyphase power source and has first and second winding sections which are interconnected with the second and first winding sections respectively of the corresponding phase winding of the other motor to equalize the load between the motors.

17 Claims, 8 Drawing Figures

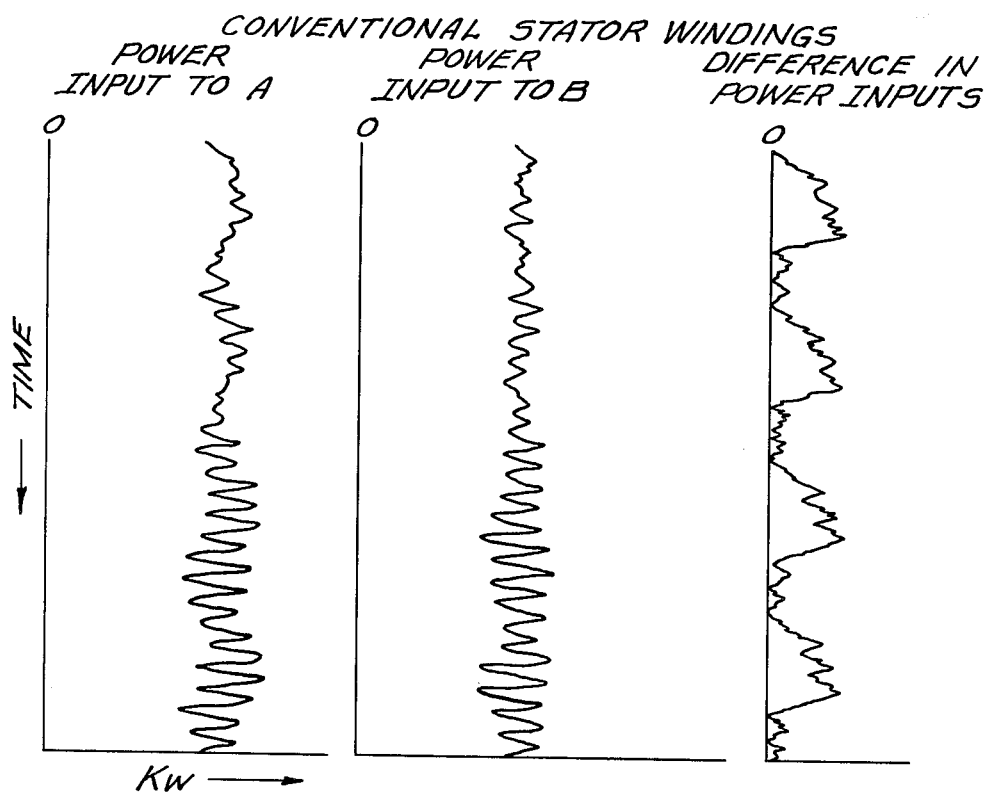
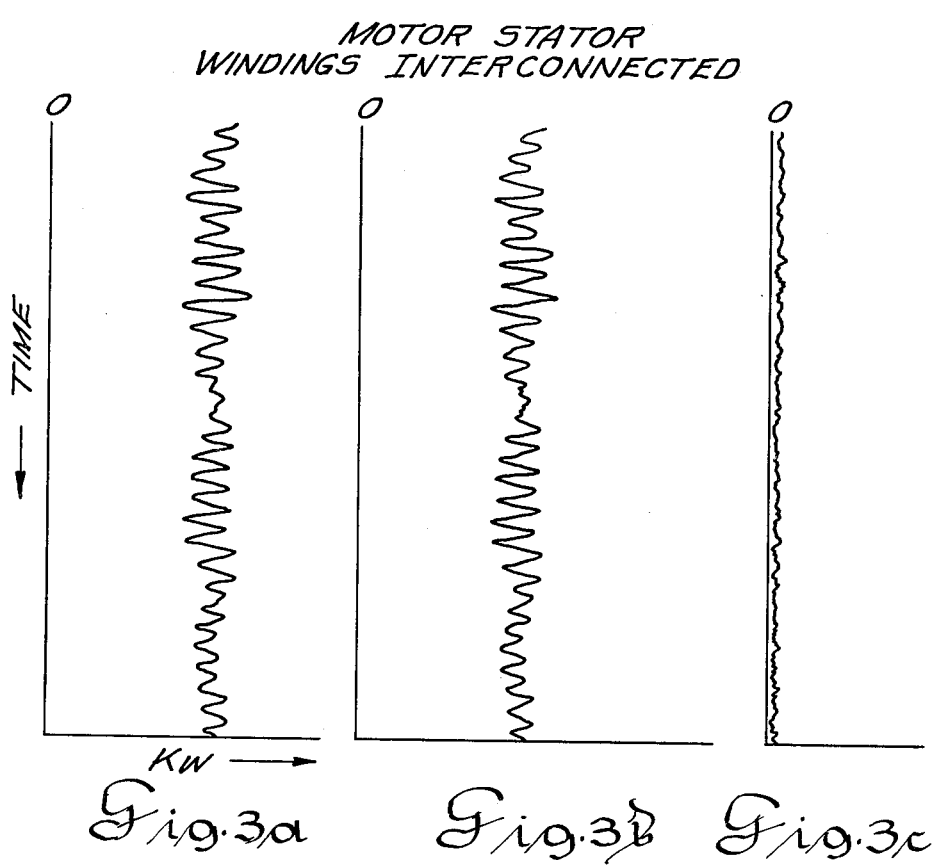

PLURAL ELECTRIC MOTORS DRIVING COMMON LOAD AND HAVING INTERCONNECTIONS FOR LOAD CONTROL

This is a continuation-in-part of application Ser. No. 843,453 filed Oct. 19, 1977, now abandoned, which was a continuation of application Ser. No. 633,944 filed Nov. 20, 1975, now abandoned.

This invention relates to electric motive power systems and in particular to plural electric motors driving a common load and having interconnections to effect a fixed ratio of load division between the motors.

BACKGROUND OF THE INVENTION

Large ore grinding mills used in the mining industry operate at low speeds and require drives of several thousand horsepower. Electric motive power systems for the larger sizes of such grinding mills often divide the load between two nominally identical electric motors which drive through pinions at different positions on the periphery of a bull gear coupled to the grinding mill so that the two motors are mechanically connected to the common load by the reduction gearing which reduces the speed to the low value required for the grinding mill. When the two motors are synchronous motors, a sustained unbalance in load between the two motors may exist if the angular positions of the rotors on their respective shafts do not result in the same displacement angle for the two motors. Also, for either synchronous or induction motors, an unbalanced load may oscillate back and forth between the two motors at a frequency corresponding to grinding mill speed and/or multiples thereof as a result of small errors of concentricity or of tooth pitch in the gears or slight misalignment of the shafts. Such inherent inaccuracies cause incremental changes of the displacement angle, or electrical coupling angle of each motor and in the rotational angular velocity of each motor with respect to its revolving stator field, and these incremental changes on one motor are usually out of phase with those of the other motor. Such changes in displacement angle and rotational angular velocity result in pulsating swings of load between the two motors. Such pulsating load swings and the sustained load unbalance cause higher peak loading on the gears and can result in motor overheating, vibration, and damage to the gears.

Twin motor drives for such ore grinding mills are known which utilize synchronous motors because they permit control of power factor and are more economical than induction motors, and certain of such twin synchronous motor mill drives attempt to compensate for undesirable load pulsations between motors by measuring the power inputs to the two motors and continually increasing the field excitation of the motor developing the lower torque and reducing the excitation of the motor developing the higher torque. Such known twin synchronous motor drives require special excitation systems and have high initial cost and high maintenance cost and also increase the peak values of stator current and field current on the motors. Another known motor drive for such a grinding mill utilizes twin synchronous motors with an auxiliary field winding which produces a magnetic field having a polar axis spaced angularly from the polar axis of the main field and attempts to compensate for load pulsations between motors by adjusting the angle of the magnetic axis of the motor field excitation with respect to the rotor poles so as to shift the load torque angle. This requires a very complicated and expensive rotor structure for at least one of the motors and also necessitates an elaborate and expensive control system.

OBJECTS OF THE INVENTION

It is an object of the invention to provide a plural electric motor drive system having improved means for maintaining the desired division of load between the motors and for eliminating pulsating load swings between the motors.

It is a further object of the invention to provide a plural electric motor system mechanically coupled to a common shaft and having improved means to eliminate input power variations, both sustained and oscillating, between the motors.

Another object of the invention is to provide a dual polyphase electric motor drive system wherein the motor rotors are mechanically coupled to a common shaft and having means including plural winding sections in the stator phase windings interconnected between the motors to compensate for differences in displacement angles and variations in rotational angular velocity in the two motors so that their output torques are substantially equal.

Still another object of the invention is to provide a dual polyphase electric motor drive system for sharing a common load having means including plural winding sections in the stator phase windings with at least one winding section connected in series with a different winding section of the corresponding phase winding of the other motor to cause the respective winding sections in each phase winding to have different motor torque effects and compensate for differences in displacement angles and variations in rotational angular velocity in the two motors.

It is a further object of the invention to provide a plural synchronous motor drive system for a large grinding mill having improved means for improving the load sharing of the motors and which is lower in both initial cost and in maintenance cost than the above discussed prior art systems.

A still further object of the invention is to provide such a plural synchronous motor drive system for a large grinding mill having improved means for effecting load equalization between the motors and which, in comparison to known load equalization systems, does not require special excitation or control systems for the motor; is simpler and less expensive; and has reduced maximum field current and stator current for the motors.

SUMMARY OF THE INVENTION

A load equalization motive drive system in accordance with the invention has plural electric motors mechanically coupled to drive a common load for sharing thereof, and the revolving flux generating stator winding of each motor comprises phase windings each energized from one phase of a polyphase source and having plural winding sections interconnected with the winding sections of the corresponding phase winding of another motor to equalize the load between the machines. The preferred embodiment has a pair of substantially identical synchronous motors driving the shaft of a grinding mill so that the flux generated by the field winding interacts with the stator rotating magnetic field to produce motor torque, and each stator phase winding has first and second winding sections with the first winding section connected in series with the second winding section of the corresponding phase winding of the other motor to reduce pulsations in load between the motors.

DESCRIPTION OF THE DRAWINGS

The above and other objects and advantages of the invention will be more readily apparent from the following detailed description when considered in conjunction with the accompanying drawings wherein:

FIG. 2a, 2b and 2c respectively show: (a) typical power input to synchronous motor A; (b) a typical power input to synchronous motor B; and (c) the difference in the kilowatt inputs to motors A and B during approximately four revolutions of the mill over a twenty second period when the stator windings of motors A and B are of conventional construction with no interconnection therebetween (the kilowatt scale in FIG. 2c being one-half that in FIG. 2a or 2b);

FIGS. 3a, 3b and 3c respectively show: (a) typical power input to synchronous motor A; (b) typical power input to synchronous motor B; and (c) the difference in the power inputs to motors A and B over approximately four revolutions of the mill during a twenty second period when the stator windings thereof are constructed and interconnected in accordance with the present invention (the kilowatt scale in FIG. 3a being one-half that in FIGS. 3a or 3b)

Figure 1:
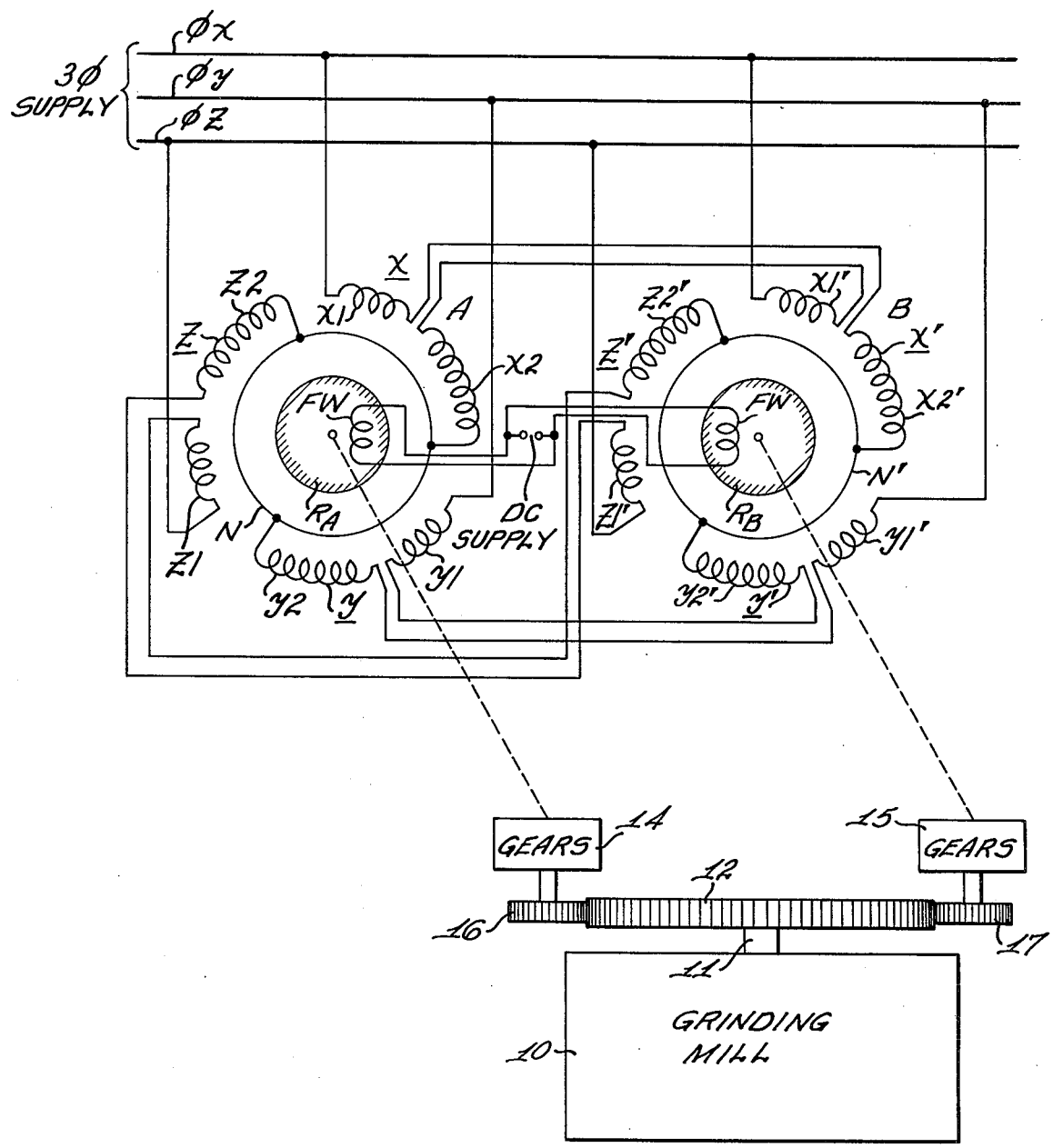
FIG. 1 is a schematic circuit diagram of a load equalization motive drive system utilizing synchronous motors for a grinding mill embodying the invention.
Figure 4:
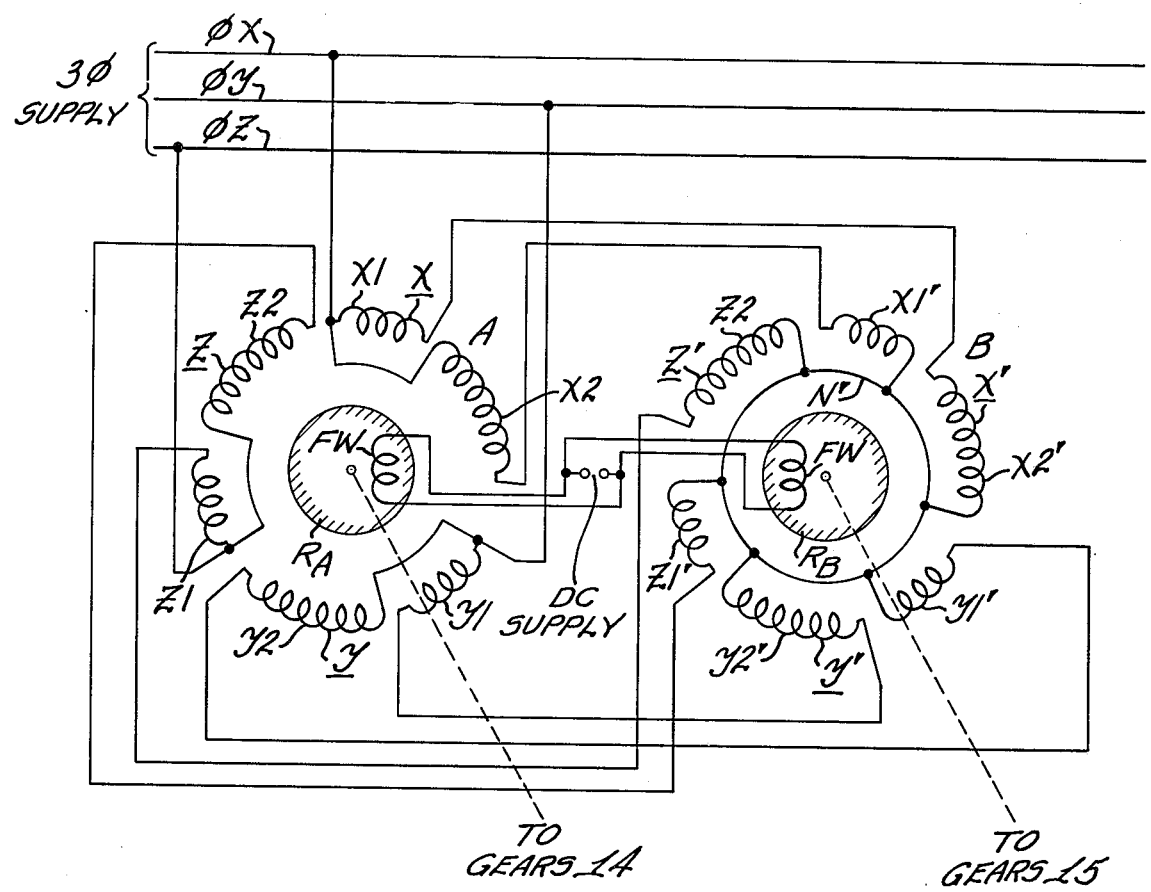
FIG. 4 is a schematic circuit diagram of an alternative load equalization motive drive system with synchronous motors embodying the invention.

It will be appreciated that FIGS. 1 and 4 are schematic circuit diagrams which show the motor phase windings and sections thereof and also their connections to the electrical power source and the interconnections between motors; but these diagrams do not show the physical locations on the stators for these windings as will be described in the detailed description which follows.

DETAILED DESCRIPTION

FIG. 1 illustrates diagrammatically two nominally identical synchronous motors A and B coupled to a common load so that both motors drive the load and share it equally between them. One example of such a drive is a large ore grinding mill 10 (shown in block form) whose drive shaft 11 is affixed to a bull gear 12. Grinding mill 10 preferably operates at low speed and may require a drive of several thousand horsepower. Motors A and B drive bull gear 12 through double reduction gearing 14 and 15 (shown in block form) respectively coupled to the rotors $R_A$ and $R_B$ of motors A and B and which drive pinions 16 and 17 that mesh with opposite sides of bull gear 12. Motors A and B preferably have the same rating, speed and characteristics so as to divide the load equally and in the disclosed embodiment each may be a salient twelve pole synchronous motor of 1000 horsepower rating with DC field windings FW on the rotors $R_A$ and $R_B$ energized from a common unidirectional power supply.

Motor A has a three phase AC armature winding on its stator comprising three phase windings x, y, z energized from individual phase $\phi_x$, $\phi_y$ and $\phi_z$ respectively of a three phase electrical power source and connected in wye to a neutral N, and similarly motor B has a three phase AC armature winding on its stator comprising three phase windings x', y', z' energized from individual phases $\phi_x$, $\phi_y$ and $\phi_z$ of the three phase power line and connected in wye to a neutral N'. The neutrals N and N' may be internal, as shown, or the individual neutral leads may be brought out for external connection. The phase windings may have a single path (as shown) or comprise a mutliplicity of parallel paths.

If the motor stator windings are of conventional construction and are connected separately to the electrical power source, a sustained difference in load on motors A and B may exist if their rotors are not angularly positioned relative to their respective shafts to result in the same displacement angle. Also, pulsations or swings in load on each motor A and B occur, in addition to normal mill load variations, because of inaccuracies such as in concentricity or in tooth pitch in the gears or misalignment in the shafts. For nominally identical motors A and B, the kilowatt inputs to the two motors should be identical if the loads on the motors are equal (assuming identical losses in the two motors). Thus the division of load between motors A and B is shown by their kilowatt inputs. When stator windings of motors A and B are of conventional construction and are connected separately to the electrical power source, FIGS. 2a, 2b and 2c respectively illustrate over approximately twenty seconds and four revolutions of the grinding mill: (a) typical variation of kilowatt input to motor A; (b) typical variation of kilowatt input to motor B; and (c) the difference in power inputs to motors A and B, which difference is indicative of the division in load between the motors. The major portion of the amplitude variations of the power inputs shown in FIGS. 2a and 2b are imposed by the mill load itself, and similar variations would be observed even if a single motor were driving the grinding mill. It will be noted from FIG. 2c that the unbalance in load between the two motors consists not only of a variation at mill rotational frequency but also of an average sustained variation directly related to a difference in the angular positions of the rotors on their shafts. It will thus be recognized that loads of varying magnitude and phase angle persist on the two motors with conventional stator windings and may cause excessive wear of the gears and overheating of the motors.

In accordance with the invention each stator phase winding x, y, z of motor A and each stator phase winding x', y', z' of motor B is divided into a plurality of sections and the sections of the corresponding phase windings in the two machines are interconnected to promote load sharing between the machines. Stator phase winding x of motor A may be divided into a first section x1 and a second section x2. Stator phase winding x' of motor B my similarly be divided into a first section x1' and a second section x2'. One side of first section x1 of motor A may be connected to power supply phase $\phi_x$ and the other side of first section x1 may be connected to one end of second section x2' of the corresponding phase winding of motor B and whose other side may be connected to neutral N'. Similarly one side of first winding section x1' of motor B may be connected to power supply conductor $\phi_x$ and the other side thereof may be connected to one end of second section x2 of the corresponding phase winding of motor A and whose opposite end may be connected to neutral N.

One side of stator phase winding first section y1 of motor A may be connected to power supply phase $\phi_y$ and its opposite end may be connected to one end of the corresponding stator phase winding section section y2' of motor B and whose opposite end is connected to neutral N'. Similarly one end of phase winding first section y1' of motor B may be connected to power supply phase line $\phi_y$ and its opposite end connected to one end of the corresponding phase winding section y2 of motor A and whose opposite end is connected to neutral N of motor A.

One side of stator phase winding first section z1 of motor A may be connected to power supply phase conductor $\phi_z$ and its opposite end may be interconnected to one end of the corresponding phase winding section z2' of motor B whose opposite end is connected to neutral N' of motor B. Similarly one end of stator phase winding first section z1' of motor B may be connected to power supply phase conductor $\phi_z$ and its opposite end interconnected to one side of the corresponding phase winding second section z2 of motor A whose opposite end is connected to neutral N of machine A.

The ratio $K_A$ of the number of turns in each phase winding first section, such as X1, to the total number of turns in the phase winding (i.e., in X1 plus X2) in the illustrated embodiment is one-third. FIGS. 3a and 3b illustrate typical power inputs to motor A and to motor B respectively over approximately a twenty second period and during four revolutions of the grinding mill when the stator windings are constructed and interconnected to embody the invention as shown in FIG. 1. FIG. 3c illustrates the input power differential to motors A and B and shows that the average or sustained difference in load as well as the pulsations in unbalanced load between the two machines at the speed of the grinding mill are compensated for and substantially eliminated by the disclosed interconnection of motor stator windings even though the normal variations in power input imposed by the mill load itself persist.

In alternative embodiments (not shown) the field windings FW of the two motors A and B may be connected in series across a common power source to minimize the effects of induced field currents arising from oscillations in load between the machines.

It will be appreciated that a different ratio $K_A$ may be utilized in embodiments of my invention employing motors of different characteristics, or employing interconnections of windings sections between motors different than those disclosed in the FIG. 1 embodiment.

FIG. 4 illustrates an alternate embodiment of the invention wherein the first and second winding sections in each phase winding are connected together at a common point within the motor in contrast to FIG. 1 embodiment wherein the first and second winding sections in each phase winding are discontinuous from each other. For example, for motor A in the FIG. 4 embodiment first winding section x1 of phase winding x has a terminal lead connected to $\phi_x$ of the electrical power supply and this same point of section x1 is connected internally within the motor winding to one end of section x2, in contrast to the FIG. 1 embodiment wherein winding sections x1 and x2 are not connected together within the motor and are discontinuous from each other. For motor B in the FIG. 4 embodiment first and second winding section x1' and x2' of phase winding x' are connected together at their neutral ends internally within the motor winding at the neutral connection N', in contrast to the FIG. 1 embodiment wherein winding sections x1' and x2' of phase winding x' are not connected together within the motor and are discontinuous from each other. The FIG. 4 embodiment also differs from the FIG. 1 embodiment in that motor A has three terminal leads connected to the electrical power supply but has no internal neutral connections, whereas motor B has no connections to the electrical power supply but has an internal neutral connection for all winding sections.

The phase windings and winding sections of the FIG. 4 embodiment may be identical to those of the FIG. 1 embodiment and may differ only in the manner of making connections to each other and to the electrical power supply and in the manner of making the interconnections between the motors.

It will be apparent from FIGS. 1 and 4 that in both of these embodiments each current path from one phase of the electrical power supply to a neutral connection consists of a first winding section of a phase of one motor connected in series with the second winding section of the similar phase winding of the other motor and that the currents in the two winding sections comprizing one series circuit will always be equal to each other but may be different than the currents in the series circuit comprized of the other second and first winding sections of the same phase. The currents and variations thereof in each of these circuits are influenced by the displacement angles and rotational angular velocities of both motors and by the separate and different effects of the two winding sections which may have different numbers of turns as expressed by the ratio $K_A$. The currents in the two winding sections of three phases of each motor interact with the field winding magnetic field of each motor to cause separate and different torque effects in the two winding sections of each motor and in the total torque of each motor in an amount which also is influenced by the turn ratio $K_A$.

When a value of $K_A$ is used which is suitable for the charcateristics of the two motors, the effects of $K_A$ on the currents in the winding sections and on the separate and different torque effects of the winding sections will essentially equalize the torques of the two motors and eliminate difference in torque between the two motors that would otherwise be caused in conventional motors by sustained differences in displacement angle and by variations in the displacement angles and rotational angular velocities of the two motors.

The separate and different effects of the winding sections tending to equalize motor torques are enhanced when the first winding sections for all of the phase windings are on one portion of the periphery of the stator and the second winding sections for all of the phase windings are on the remaining different portion of the periphery of the stator, with only the minimum amount of overlapping or interleaving of coils at the ends of the two winding sections such as would normally occur with coils placed in the slots in the normal manner. For example, for a twelve pole machine the phase windings for four consecutive poles may comprise the first winding sections for the three phase windings and the phase windings for the remaining eight consecutive poles may comprise the second winding sections for the three phase windings, in which case $K_A$ would be one-third. The overlapping and interleaving of the coils at the ends of the winding sections tends to equalize the currents in the circuits consisting of two winding sections of each phase because of the mutual inductance between winding sections in this region of overlap, whereas differences in currents are desired, and the separate torque effects of different currents in the two winding sections tend to cancel or offset each other in this region of overlap whereas the separate torque effects are desired. In commonly used terminology, the winding sections are preferably comprised of portions of the stator winding which are "concentrated" rather than "distributed" with respect to the periphery of the stator, although the invention is not limited to one consecutive group of poles for each winding section, and neither is the invention limited to an integral number of poles or coils groups for each winding section.

My invention also comprehends a delta connection at the power source with parallel connection of the corresponding phase winding circuits in the two motors with each circuit comprising cross-connections of first and second winding sections of different motors in the manner of the FIG. 1 and FIG. 4 embodiments. My invention further comprehends interconnection of stator windings of induction motors such as those of the wound rotor or the squirrel cage type instead of synchronous motors as well as interconnection of winding sections of corresponding stator phase windings in two motors through resistances, inductances or capacitances to equalize the load between the two motors.

While only two embodiments of my invention have been illustrated and described, many modifications and variations thereof will be readily apparent to those skilled in the art, and consequently it should be understood that I do not intend to be limited to the particular embodiments shown and described.

The embodiments of the invention in which an exclusive property or privilege is claimed are defined as follows:

1. A drive system comprising a pair of electric motors coupled to drive a common load for sharing thereof, each of said motors having a rotor and a stator with a rotating magnetic field generating polyphase winding thereon comprising plural phase windings energized from individual phases of a polyphase electrical power source to generate a rotating magnetic field within the stator, each of said phase windings including plural winding sections with at least one winding section connected in series with a different winding section of the corresponding phase winding of the other motor to thereby permit the respective winding sections in each said phase winding to have different motor torque effects.

2. A drive system in accordance with claim 1 wherein each said phase winding of each motor includes first and second winding sections connected in series with said second and said first winding sections respectively of the corresponding phase winding of the other motor.

3. A drive system in accordance with claim 1 or 2 wherein said motors are synchronous motors and have a field winding whose magnetic field interacts with the magnetic fields produced by said respective winding sections in each phase winding to produce different motor torque effects.

4. A drive system comprising a pair of synchronous electric motors whose rotors are mechanically coupled to a common shaft, each of said motors having a stator with a rotating magnetic field generating polyphase winding thereon comprising a plurality of phase windings adapted to be energized from individual phases of a polyphase electrical source, and means including plural winding sections in each said phase winding for compensating for differences in displacement angles in said pair of motors so that the output torques of said pair of synchronous motors are substantially equal, at least one said winding section in each phase winding of each motor being connected in series with a different winding section of the corresponding phase winding of the other motor.

5. A drive system in accordance with claim 4 wherein each said phase winding comprises first and second winding sections and said means for compensating connects the first winding section in each phase winding of one motor in series with the second winding section of the corresponding phase winding of the other motor.

6. A drive system comprising two electrical motors having their rotors mechanically coupled to a common shaft, each of said motors having a stator with a rotating magnetic field generating polyphase winding thereon comprising plural phase windings adapted to be energized from individual phases of a polyphase electrical power source to generate a rotating magnetic field within said stator, each said phase winding comprising first and second winding sections, said first winding section and said second winding section of each phase winding of one of said motors being connected in series with the second winding section and the first winding section respectively of the corresponding phase winding of the other motor, whereby said first and second winding sections in each phase winding can have different motor torque effects.

7. A drive system comprising a pair of synchronous motors each of which has a stator with a rotating magnetic field generating polyphase winding thereon comprising plural phase windings adapted to be energized from individual phaes of a polyphase source and a rotor with a field winding thereon, said rotors of said pair of motors being mechanically coupled to a common shaft, each said phase winding of each motor comprising plural winding sections with at least one winding section connected in series with a different winding section of the corresponding phase winding of the other motor.

8. A drive system in accordance with claim 7 wherein each said phase winding of each motor comprises first and second winding sections which are connected in series respectively with the second and the first winding sections of the corresponding phase winding of the other motor.

9. A drive system comprising a pair of wound rotor induction motors whose rotors are mechanically coupled to a common shaft, each of said motors having a stator with a polyphase winding thereon comprising plural phase primary windings adapted to be energized from individual phases of a polyphase source to generate a rotating magnetic field within the stator and a rotor with a secondary winding thereon in which voltage is induced by said rotating magnetic field, each said phase primary winding comprising first and second winding sections and wherein said first winding section and said second winding second of each phase primary winding of each motor is connected in series with the second and the first winding section respectively of the corresponding phase winding of the other motor.

10. A drive system comprising a pair of synchronous electric motors coupled to drive a common load for sharing thereof, each of said motors having a stator with a rotating magnetic field generating polyphase winding thereon comprising a plurality of phase windings adapted to be energized from individual phases of a polyphase electrical power source to generate a rotating magnetic field within said stator, a field winding, and a rotor, means for exciting said fied winding, each said phase winding of each motor comprising first and second winding sections connected in series with the second and first winding sections respectively of the corresponding phase winding of the other motor.

11. A drive system in accordance with any one of claims 1, 2 or 4 through 10 wherein the respective winding sections in each said phase winding have different numbers of turns and produce different motor torque effects.

12. A drive system in accordance with any one of claims 1, 2 or 4 through 10 wherein said winding sections in each said phase winding are discontinuous from each other.

13. A drive system in accordance with claim 2, 5, 6, 8, 9 or 10 wherein the first and the second winding sections in each phase winding are connected together at a common point internally of the motor, each phase winding of one motor has a terminal lead connected internally to one end of each of the first and second winding sections thereof and adapted to be connected to one phase of said power source, and the other motor has an internal neutral connection to one end of the first and of the second winding sections of each phase winding thereof.

14. A drive system in accordance with claim 2, 5, 6, 8, 9 or 10 wherein the first winding sections for all the phase windings of each motor are on one portion of the periphery of the stator and the second winding sections for all the phase windings of each motor are on the remaining different portion of the periphery of the stator.

15. A drive system in accordance with claim 2, 5, 6, 8, 9 or 10 wherein the number of turns in said first winding section of each phase winding is different from the number of turns in said second winding section thereof.

16. A drive system in accordance with claim 15 wherein the ratio of the number of turns in said first winding section to the number of turns in said second winding section in each said phase winding is selected to effect equalization of output torques from said two motors.

17. A drive system comprising two synchronous electric motors whose rotors are mechanically coupled to a common shaft, each of said motors having a stator with a rotating magnetic field generating polyphase winding thereon comprising a plurality of phase windings adapted to be energized from individual phases of a polyphase source, each said phase winding including plural winding sections, and means for interconnecting the winding sections in the phase windings of each motor in series with the winding sections of the corresponding phase winding of the other motor so that the respective winding sections in each phase winding have different motor torque effects and aid in equalizing the output torques of the two motors.

* * * * *